US 10,796,484 B2

(12) United States Patent
Chitavadigi et al.

(10) Patent No.: US 10,796,484 B2
(45) Date of Patent: Oct. 6, 2020

(54) SYSTEM AND METHOD FOR INTERACTIVE MULTIMEDIA AND MULTI-LINGUAL GUIDED TOUR/PANORAMA TOUR

(71) Applicant: Anand Babu Chitavadigi, Bellary (IN)

(72) Inventors: Anand Babu Chitavadigi, Bellary (IN); Sivaprakasha Lottanaker, Bellary (IN); Bavi Shashidher, Bellary (IN)

(73) Assignee: Anand Babu Chitavadigi, Bellary (IN)

( * ) Notice: Subject to any disclaimer, the term of this patent is extended or adjusted under 35 U.S.C. 154(b) by 0 days.

(21) Appl. No.: 16/009,184

(22) Filed: Jun. 14, 2018

(65) Prior Publication Data

US 2018/0365894 A1    Dec. 20, 2018

(30) Foreign Application Priority Data

Jun. 14, 2017 (IN) .............................. 201641042642

(51) Int. Cl.
*G06T 19/00* (2011.01)
*G06Q 20/02* (2012.01)
*G06Q 20/12* (2012.01)
*G06F 40/58* (2020.01)

(52) U.S. Cl.
CPC ............ *G06T 19/003* (2013.01); *G06F 40/58* (2020.01); *G06Q 20/027* (2013.01); *G06Q 20/123* (2013.01); *G06T 19/006* (2013.01)

(58) Field of Classification Search
None
See application file for complete search history.

(56) References Cited

U.S. PATENT DOCUMENTS

| | | | | |
|---|---|---|---|---|
| 5,805,155 A | * | 9/1998 | Allibhoy | H04N 7/17318 348/E5.108 |
| 6,512,515 B1 | * | 1/2003 | Smith | G06T 9/001 345/419 |
| 6,654,886 B1 | * | 11/2003 | Challener | G06F 21/31 709/228 |
| 6,735,574 B2 | * | 5/2004 | Bull | G06Q 10/06398 705/32 |
| 7,054,819 B1 | * | 5/2006 | Loveland | G06F 21/32 345/419 |
| 7,113,918 B1 | * | 9/2006 | Ahmad | G06Q 30/00 345/156 |

(Continued)

*Primary Examiner* — Martin Mushambo
(74) *Attorney, Agent, or Firm* — Barry Choobin; Patent 360 LLC

(57) ABSTRACT

The embodiments herein provide a system and method for providing interactive multimedia and multi-lingual tour guide. The system and method presents an audio-visual tour of a place of interest to a user on his/her personal smart devices such as smartphone or tablet. The user is enabled to navigate through 360 degree panorama visuals of the place of interest such as a monument with a graphical user interface alone with audio support in multiple languages. On reaching near or at the place of interest the user connects to a locally installed hardware device present at the place of interest and browses the guided tour on the computing device of the user. The interactive multimedia and multi-lingual guided tour/panorama tour of the present invention is accessible even if the user is not present at or near the place of interest by connecting to the cloud servers provided by the system through internet.

17 Claims, 2 Drawing Sheets

(56) References Cited

U.S. PATENT DOCUMENTS

| | | | | |
|---|---|---|---|---|
| 7,130,742 B2* | 10/2006 | Kobuya | G01C 21/20 | 701/409 |
| 7,200,804 B1* | 4/2007 | Khavari | G06F 17/243 | 715/230 |
| 8,090,803 B2* | 1/2012 | Payne | G08B 25/085 | 709/219 |
| 8,441,475 B2* | 5/2013 | Hamilton, II | A63F 13/12 | 345/419 |
| 8,533,860 B1* | 9/2013 | Grecia | H04L 63/083 | 726/29 |
| 8,667,081 B2* | 3/2014 | Edecker | H04L 29/12066 | 709/217 |
| 8,730,231 B2* | 5/2014 | Snoddy | G06Q 30/02 | 345/419 |
| 8,769,393 B1* | 7/2014 | Abhyanker | G06Q 10/10 | 715/201 |
| 8,779,265 B1* | 7/2014 | Gottlieb | G10H 1/0033 | 84/600 |
| 8,903,426 B2* | 12/2014 | Tholkes | H04W 4/021 | 455/456.3 |
| 8,976,169 B1* | 3/2015 | Barreirinhas | G06T 15/04 | 345/419 |
| 9,171,396 B2* | 10/2015 | Jenkins | G06T 15/40 | |
| 9,349,201 B1* | 5/2016 | Gault | A63F 13/53 | |
| 9,441,981 B2* | 9/2016 | Abhyanker | G01C 21/3438 | |
| 9,443,556 B2* | 9/2016 | Cordell | G11B 27/10 | |
| 9,459,622 B2* | 10/2016 | Abhyanker | G01C 21/36 | |
| 9,590,754 B2* | 3/2017 | Rao | G06Q 30/02 | |
| 9,669,296 B1* | 6/2017 | Hibbert | A63F 13/12 | |
| 9,911,154 B2* | 3/2018 | Baker | G06Q 20/105 | |
| 9,973,466 B2* | 5/2018 | Renaud | H04W 4/21 | |
| 10,002,337 B2* | 6/2018 | Siddique | G06Q 10/0637 | |
| 2001/0034661 A1* | 10/2001 | Ferreira | G06F 3/04815 | 705/14.4 |
| 2002/0011951 A1* | 1/2002 | Pepin | G09B 29/008 | 342/357.34 |
| 2003/0070063 A1* | 4/2003 | Boyle | H04L 29/06 | 713/2 |
| 2004/0010786 A1* | 1/2004 | Cool | G06F 8/65 | 717/170 |
| 2004/0154042 A1* | 8/2004 | Caporicci | H04N 7/17318 | 725/87 |
| 2004/0266347 A1* | 12/2004 | Palin | H04L 63/18 | 455/41.1 |
| 2005/0128212 A1* | 6/2005 | Edecker | G06T 15/04 | 345/582 |
| 2007/0005758 A1* | 1/2007 | Hughes, Jr. | G06F 21/51 | 709/224 |
| 2007/0083415 A1* | 4/2007 | Forrest | G06Q 10/10 | 705/14.46 |
| 2007/0271328 A1* | 11/2007 | Geelen | G06Q 20/102 | 709/201 |
| 2007/0300308 A1* | 12/2007 | Mishura | G06F 21/10 | 726/27 |
| 2008/0201227 A1* | 8/2008 | Bakewell | G06Q 30/02 | 705/14.19 |
| 2008/0231630 A1* | 9/2008 | Shenkar | G06T 17/05 | 345/419 |
| 2008/0262828 A1* | 10/2008 | Och | G06F 17/2818 | 704/3 |
| 2009/0106118 A1* | 4/2009 | Pelegero | G06Q 20/10 | 705/26.1 |
| 2009/0106671 A1* | 4/2009 | Olson | G06F 3/011 | 715/757 |
| 2009/0106672 A1* | 4/2009 | Burstrom | A63F 13/12 | 715/757 |
| 2010/0131385 A1* | 5/2010 | Harrang | G06Q 30/00 | 705/26.1 |
| 2012/0081362 A1* | 4/2012 | Kiraly | G06T 19/00 | 345/419 |
| 2013/0080242 A1* | 3/2013 | Alhadeff | G06Q 30/0239 | 705/14.39 |
| 2013/0106910 A1* | 5/2013 | Sacco | G06T 19/006 | 345/633 |
| 2013/0147838 A1* | 6/2013 | Small | G06F 3/013 | 345/633 |
| 2013/0151405 A1* | 6/2013 | Head | G06Q 20/36 | 705/41 |
| 2013/0215116 A1* | 8/2013 | Siddique | G06Q 30/0643 | 345/420 |
| 2013/0222367 A1* | 8/2013 | Mariappan | G06Q 30/02 | 345/419 |
| 2013/0242189 A1* | 9/2013 | Babu | H04N 7/0885 | 348/468 |
| 2014/0012417 A1* | 1/2014 | Zelivinski | H04N 21/214 | 700/257 |
| 2014/0043320 A1* | 2/2014 | Tosaya | G02B 27/0172 | 345/419 |
| 2014/0237081 A1* | 8/2014 | Zhu | H04L 67/327 | 709/219 |
| 2014/0267240 A1* | 9/2014 | Smith | G06T 19/006 | 345/419 |
| 2014/0347973 A1* | 11/2014 | Yu | H04W 24/04 | 370/216 |
| 2015/0032838 A1* | 1/2015 | Demsey | H04L 67/2842 | 709/213 |
| 2015/0039709 A1* | 2/2015 | Jacobs | H04L 51/10 | 709/206 |
| 2015/0052475 A1* | 2/2015 | Rapoport | G06T 11/60 | 715/790 |
| 2015/0073700 A1* | 3/2015 | Huang | H04W 4/21 | 701/438 |
| 2015/0095941 A1* | 4/2015 | Kim | H04N 21/4307 | 725/32 |
| 2015/0127486 A1* | 5/2015 | Advani | G06Q 30/0241 | 705/26.41 |
| 2015/0278871 A1* | 10/2015 | Wolfe | G06Q 30/0267 | 705/14.58 |
| 2015/0294390 A1* | 10/2015 | Fan | G06Q 30/0605 | 705/26.4 |
| 2015/0348327 A1* | 12/2015 | Zalewski | G06F 3/01 | 345/419 |
| 2015/0369617 A1* | 12/2015 | Ding | G01C 21/34 | 701/428 |
| 2016/0029002 A1* | 1/2016 | Balko | H04N 9/7921 | 386/230 |
| 2016/0066004 A1* | 3/2016 | Lieu | H04N 21/2541 | 725/29 |
| 2016/0094509 A1* | 3/2016 | Ye | H04L 51/32 | 709/206 |
| 2016/0125449 A1* | 5/2016 | Beatty | G06Q 30/0238 | 705/14.38 |
| 2016/0295539 A1* | 10/2016 | Atti | H04W 56/0045 | |
| 2016/0301964 A1* | 10/2016 | Laliberte | G06Q 30/0207 | |
| 2017/0032370 A1* | 2/2017 | Beltramino | G06Q 20/36 | |
| 2017/0103290 A1* | 4/2017 | Guionneau | G06Q 10/0833 | |
| 2017/0131855 A1* | 5/2017 | Svendsen | G11B 27/031 | |
| 2017/0228799 A1* | 8/2017 | Perry | G06Q 30/0277 | |
| 2017/0251261 A1* | 8/2017 | James | H04N 21/2393 | |
| 2017/0325064 A1* | 11/2017 | Kernan | H04W 4/029 | |
| 2017/0373869 A1* | 12/2017 | Xue | H04L 29/06 | |
| 2018/0330354 A1* | 11/2018 | Xiu | G06Q 20/3276 | |
| 2018/0349901 A1* | 12/2018 | Chen | G06Q 20/08 | |
| 2018/0356635 A1* | 12/2018 | Haley | G02B 27/017 | |

* cited by examiner

SYSTEM AND METHOD FOR INTERACTIVE MULTIMEDIA AND MULTI-LINGUAL GUIDED TOUR/PANORAMA TOUR

CROSS-REFERENCE TO RELATED APPLICATIONS

The embodiments herein claim the priority of the Indian Provisional Patent Application No. 201641042642 filed on Dec. 14, 2016 and subsequently postdated by 6 months to Jun. 14, 2017 with the title "SYSTEM AND METHOD FOR INTERACTIVE MULTIMEDIA GUIDED TOUR", and the contents of which is included entirely as reference herein.

BACKGROUND

Technical Field

The embodiments herein are generally related to the field of self guided tours. The embodiments herein are particularly related to electronic tour guides. The embodiments herein are more particularly related to a system and method for interactive multimedia and multi-lingual guided tour/panorama tour with multiple audio support.

Description of the Related Art

Travelling, exploring and learning about different places is considered one of the best hobby by many people. A tourist always wishes to see the most interesting things/places available in a most convenient manner and learn about the same. A tourist destination may contain many attractions that a user can experience such as historical monuments, a tourist spot, a museum, a local park, a historic location and the like. However, for travelling and exploring newer places, the tourist needs to gain a deep insight into the various aspects related to the travel destination and the tourist attractions present there.

For gaining insights related to the travel destination and its attractions, there are several ways available such as tour books, tour buses with tour guides that provide a running commentary on notable monuments, buildings and events as the tour bus passes through various sections of the city and the like. In some places, tourists hire hand held audio devices at the monument. In some cases, the users can also hire a knowledgeable tour guide or taxi cab driver to provide a more personal tour.

However, the tour books are designed in a way to make it easy to carry and thus provide limited information. Further, these books only provide textual description and do not provide lively experience with visual and audio description. Oftentimes, the way the information is organized requires the user to do a lot of reading and pre-planning before a journey. Further, as far as tour guides or taxi drivers are concerned, the language plays an important role and it becomes tedious when one is unfamiliar with the language. Availability of a good tourist guide is also an issue during peak seasons. Additionally, a pre-packaged tour typically on a crowded bus with a translator/tour guide makes the situation even worse and the users are left with a bare minimum knowledge to appreciate the historical significance or beauty of the monument/place. Such pre-packaged tours do not provide personalized experience and are often constrained heavily by time factor and thus users do not get to spend sufficient time at the place of interest. There are some audio-visual tourist guides also available which try to solve this problem although they provide monologue audio details about the place and does not provide audio or visual details for each and every minute aspect of the place of interest. Additionally, the users need to repeatedly forward and reverse the audio visual guide to understand the available details.

Hence there is a need for a system and method for providing interactive guided tour without any human intervention and to provide more lively experience with audio and visual support. There is also a need for a system and method providing 360 degree panoramic view of the place of interest with multiple audio providing details of every aspect of the place of interest. Further, there is a need for a system and method providing guided tour of the place of interest in multiple languages.

The above mentioned shortcomings, disadvantages and problems are addressed herein and which will be understood by reading and studying the following specification.

OBJECTS OF THE EMBODIMENTS HEREIN

The primary object of the embodiments herein is to provide a system and method for providing an interactive multimedia and multi-lingual guided tour/panorama tour of a place of interest on smart devices like Smartphones and tablets without any human intervention.

Another object of the embodiments herein is to provide a system and method for providing a 360 degree panoramic view of the place of interest with multiple audio and visual supports to enhance user experience.

Yet another object of the embodiments herein is to provide a system and method for providing a guided tour of the place of interest in multiple languages.

Yet another object of the embodiments herein is to provide a system and method for providing a guided tour of the place of interest via a connectivity device hosted at the place of interest without the need of interest.

Yet another object of the embodiments herein is to provide a system and method for providing a guided tour of the place of interest through internet.

Yet another object of the embodiments herein is to provide a system and method for providing information about the place of interest using map.

Yet another object of the embodiments herein is to provide a system and method for navigating locations closer to the place of interest using maps.

Yet another object of the embodiments herein is to provide a system and method for zooming in and zooming out of the panorama view available as part of the interactive multimedia and multi-lingual guide to provide information related to each minute details of the place of interest.

Yet another object of the embodiments herein is to provide a system and method for providing interactive multimedia and multi-lingual guide with multiple audio options within a single panorama view with one audio dedicated to each feature to be highlighted of the place of interest.

Yet another object of the embodiments herein is to provide a system and method for providing information related to the parts of the place of interest which are either no longer accessible due to certain restrictions imposed by the authority governing the place of interest.

Yet another object of the embodiments herein is to provide a system and method for providing a virtual reality tour of the place of interest.

Yet another object of the embodiments herein is to provide a system and method for preserving the historical importance of the place of interest and for providing the most authenticate and accurate information about the same.

These and other objects and advantages of the embodiments herein will become readily apparent from the following detailed description taken in conjunction with the accompanying drawings.

SUMMARY

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The following details present a simplified summary of the embodiments herein to provide a basic understanding of the several aspects of the embodiments herein. This summary is not an extensive overview of the embodiments herein. It is not intended to identify key/critical elements of the embodiments herein or to delineate the scope of the embodiments herein. Its sole purpose is to present the concepts of the embodiments herein in a simplified form as a prelude to the more detailed description that is presented later.

The various embodiments herein provide a system for providing an interactive multimedia and multi-lingual guided tour/panorama tour of a place of interest. The system comprises a computing device of the user. The computing device of the user is configured to download, install and host a software application. The software application is configured to enable the user to access the interactive multimedia and multi-lingual guided tour/panorama tour of the place of interest on request. The system also comprises a server communicatively coupled with the computing device of the user. The server comprises a user registration module configured for registering the user with the system using one or more user details. The server also comprises a first payment module configured for enabling the user to make a payment for accessing a particular interactive multimedia and multi-lingual guided tour/panorama tour. The server further comprises a content module configured for streaming audio visual content related to the requested interactive multimedia and multi-lingual guided tour/panorama tour on a successful reception of the payment from the user.

According to an embodiment herein, the interactive multimedia and multi-lingual guide tour/panorama tour comprises a 360 degree panoramic view of the place of interest with a plurality of embedded audio clips highlighting each and every feature of the place of interest.

According to an embodiment herein, the computing device of the user comprises a personal computer, a smartphone, a tablet, a laptop and a PDA.

According to an embodiment herein, the system further comprises a database. The database is configured for storing the registration details for the plurality of users associated with the system, the payment details for the plurality of transactions performed by the system and an audio visual content of a plurality of interactive multimedia and multi-lingual guided tour/panorama tours offered/linked/associated with the system.

According to an embodiment herein, the system further comprises a network connectivity device or communication device installed at each place of interest associated with the system. The network connectivity device is configured for establishing a communication with the server to synchronize the audio visual content for the interactive multimedia and multi-lingual guided tour/panorama tour from the server and for storing the synchronized audio visual content in a local database.

According to an embodiment herein, the network connectivity device is further configured for streaming the audio visual content stored in the local database to the computing device of the user on request and after reception of successful payment. The audio visual content for the requested interactive multimedia and multi-lingual guided tour/panorama tour is streamed in an offline mode (manner) from network connectivity device to the user computing device without establishing an internet connection between the computing device of the user and the server.

According to an embodiment herein, the network connectivity device is further configured for periodically synchronizing with the server for providing and installing updates regarding addition of new language, addition/updating of a new audio clip and enhancement in the visual content of the interactive multimedia and multi-lingual guided tour/panorama tour.

According to an embodiment herein, the network connectivity device further comprises a second payment module configured for enabling the users to make payments for accessing the plurality of interactive multimedia and multi-lingual guided tour/panorama tours offered by the system when the internet connection with the server is not established.

According to an embodiment herein, the user is enabled for making payment for the selected interactive multimedia and multi-lingual guided tour/panorama tour via a locally purchased scratch card, coupon codes and via a payment gateway provided in the software application hosted on the computing device of the user.

According to an embodiment herein, the network connectivity device is further configured for supporting offline maps to provide the details of the place of interest and other nearby locations to the places of interest.

According to an embodiment herein, the network connectivity device is further configured for guiding the users to reach from one place of interest to another using offline maps.

According to an embodiment herein, the system is further configured for supporting a visualization of the 360 degree panoramic view for the interactive multimedia and multi-lingual guided tour/panorama tour using a virtual reality device. The virtual reality device enables the user to experience the interactive multimedia and multi-lingual guided tour/panorama tour about the place of interest even without being physically present at the place of interest.

According to an embodiment herein, the system is configured for providing an option to the user to select a preferred language for the interactive multimedia and multi-lingual guided tour/panorama tour before streaming the audio visual content on the computing device of the user.

According to an embodiment herein, a computer implemented method comprising instructions stored on a non-transitory computer readable storage medium and executed on a computing device provided with a hardware processor and memory for providing an interactive multimedia and multi-lingual guided tour/panorama tour of a place of interest is provided. The method comprises the steps of enabling the user to connect with a locally hosted network connectivity device through a software application using his/her computing device such as smartphone or tablet. The user is prompted to register with the system through the computing device of the user based on a request received from the user. The system is configured for receiving a payment from the user for accessing a particular interactive multimedia and multi-lingual guided tour/panorama tour either via locally purchased scratch card or via a payment gateway provided in the software application hosted on the computing device of the user. The system is configured to provide an option to the user to choose a preferred language for interactive multimedia and multi-lingual guided tour/panorama tour and streaming the audio visual content related to the selected interactive multimedia and multi-lingual guided tour/panorama tour on the computing device of the user in the language selected by the user.

According to an embodiment herein, the system is further configured to stream a 360 degree panoramic view of the place of interest with a plurality of embedded audio clips dedicated to each feature of the place of interest.

According to an embodiment herein, the method further comprises establishing a communication between the user computing device and the server using internet in the absence of availability of the network connectivity device at the place of interest. The interactive multimedia and multi-lingual guided tour/panorama tour is streamed on the computing device of the user from the server using internet.

According to an embodiment herein, the method further comprises periodically synchronizing the connectivity device with the server for updates regarding addition of new language, addition/updating of a new audio clip, enhancement in the visual content of the interactive multimedia and multi-lingual guided tour/panorama tour.

According to an embodiment herein, the method further comprises enabling the users to use offline maps to provide the details of the place of interest and other nearby locations at the places of interest.

According to an embodiment herein, the method further comprises guiding the users to reach from one place of interest to another using offline maps.

According to an embodiment herein, the method further comprises supporting visualization of the 360 degree panoramic view for the interactive multimedia and multi-lingual guided tour/panorama tour using a virtual reality device. The virtual reality device enables the user to experience the interactive multimedia and multi-lingual guided tour/panorama tour about the place of interest even without being physically present at the place of interest.

The various embodiments herein provide a system and method for interactive multimedia and multi-lingual guided tour/panorama tour of a place of interest. The present invention provides a system and method for presenting an audio-visual tour of a place of interest to a user. The user is enabled to navigate through 360 degree panorama visuals of the place of interest such as a monument with a graphical user interface along with an audio support in multiple languages. On reaching near or at the place of interest, the user connects to a locally installed hardware device present at the place of interest and browses the guided tour on the smart devices like touch screen mobile phones and tablets of the user. The interactive multimedia and multi-lingual guided tour/panorama tour of the present invention is accessible even if the user is not present at or near the place of interest by connecting to the cloud servers provided by the system through internet either through Android or IOS app or through internet browser.

According to an embodiment herein, a method for embedding audio on the 360 degree panorama visuals of the place of interest is provided. The place of interest can be a historic location, and the like. At first, a user needs to connect his/her smartphone or tablet to a locally hosted connectivity device in the monument through Wi-Fi hotspot. In case, if the user is not present in the monument where hardware device is installed then he/she can connect to a cloud based system using internet either through Android or IOS app or through internet browser. The user select the guided tour of the place of interest after making a successful payment through either a payment gateway or via locally purchased scratch card. Once the guided tour of the specific monument is selected, user needs to select language of interest. Once connected an interactive audio-visual narration is initiated to provide detailed information about the place of interest selected by the user present in that location. Further the software application also allows the user to listen to the one or more audio clips embedded within the interactive multimedia and multi-lingual guide tour for every minute details of the monument at the place of interest. These embedded optional audio clips provide information about the place of interest, every monument within the place of interest or even to minute details of the monument within the place of interest. Additionally the user is enabled to play the audio clip multiple times till the user understands the details related to the monument.

According to an embodiment herein, the software application also allows the user to interact with the historic contents of the place of interest (such as musical pillar, manuscripts), and the like. The system and method further facilitates offline maps, gyroscope, VR supporting content etc.

According to an embodiment herein, the software application hosted on the computing device of the user also provides a payment gateway that facilitates the user to pay access charges related to the selected interactive multimedia and multi-lingual guided tour/panorama tour.

According to an embodiment herein, a system comprising content, hardware and software application providing an audio-visual tour of the place of interest or historical monument are provided. The system facilitates navigation around the places of interest, individual monuments and provides historical details related to each individual item and monuments present at the place of interest selected by the user.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

BRIEF DESCRIPTION OF THE DRAWINGS

The other objects, features and advantages will occur to those skilled in the art from the following description of the preferred embodiment and the accompanying drawings in which.

Figure 1:
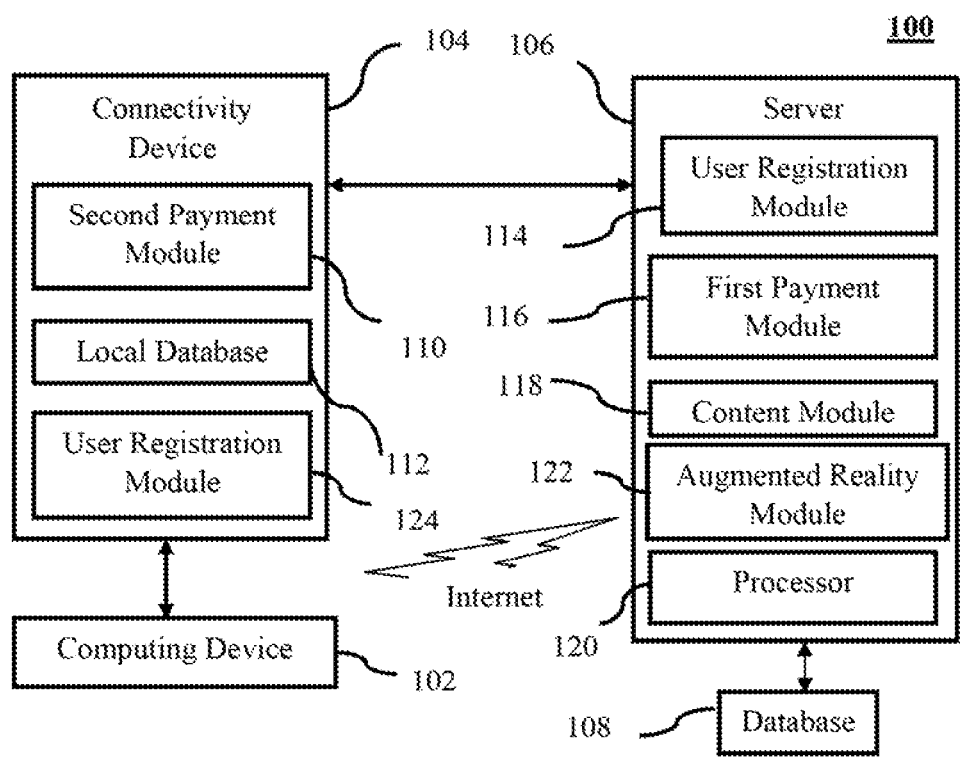
FIG. 1 illustrates a functional block diagram of a system for providing interactive multimedia and multi-lingual guided tour/panorama tour of a place of interest, according to an embodiment herein.

Although the specific features of the present invention are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The various embodiments herein provide a system for providing an interactive multimedia and multi-lingual guided tour/panorama tour of a place of interest. The system comprises a computing device of the user. The computing device of the user is configured to download, install and host a software application. The software application is configured to enable the user to access the interactive multimedia and multi-lingual guided tour/panorama tour of the place of interest on request. The system also comprises a server communicatively coupled with the computing device of the user. The server comprises a user registration module configured for registering the user with the system using one or more user details. The server also comprises a first payment module configured for enabling the user to make a payment for accessing a particular interactive multimedia and multi-lingual guided tour/panorama tour. The server further comprises a content module configured for streaming audio visual content related to the requested interactive multimedia and multi-lingual guided tour/panorama tour on a successful reception of the payment from the user.

According to an embodiment herein, the interactive multimedia and multi-lingual guide tour/panorama tour comprises a 360 degree panoramic view of the place of interest with a plurality of embedded audio clips highlighting each and every feature of the place of interest.

According to an embodiment herein, the computing device of the user comprises a personal computer, a smartphone, a tablet, a laptop and a PDA.

According to an embodiment herein, the system further comprises a database. The database is configured for storing the registration details for the plurality of users associated with the system, the payment details for the plurality of transactions performed by the system and an audio visual content of a plurality of interactive multimedia and multi-lingual guided tour/panorama tours offered/linked/associated with the system.

According to an embodiment herein, the system further comprises a network connectivity device or communication device installed at each place of interest associated with the system. The network connectivity device is configured for establishing a communication with the server to synchronize the audio visual content for the interactive multimedia and multi-lingual guided tour/panorama tour from the server and for storing the synchronized audio visual content in a local database.

According to an embodiment herein, the network connectivity device is further configured for streaming the audio visual content stored in the local database to the computing device of the user on request and after reception of successful payment. The audio visual content for the requested interactive multimedia and multi-lingual guided tour/panorama tour is streamed in an offline mode (manner) from network connectivity device to the user computing device without establishing an internet connection between the computing device of the user and the server.

According to an embodiment herein, the network connectivity device is further configured for periodically synchronizing with the server for providing and installing updates regarding addition of new language, addition/updating of a new audio clip and enhancement in the visual content of the interactive multimedia and multi-lingual guided tour/panorama tour.

According to an embodiment herein, the network connectivity device further comprises a second payment module configured for enabling the users to make payments for accessing the plurality of interactive multimedia and multi-lingual guided tour/panorama tours offered by the system when the internet connection with the server is not established.

According to an embodiment herein, the user is enabled for making payment for the selected interactive multimedia and multi-lingual guided tour/panorama tour via a locally purchased scratch card, coupon codes and via a payment gateway provided in the software application hosted on the computing device of the user.

According to an embodiment herein, the network connectivity device is further configured for supporting offline maps to provide the details of the place of interest and other nearby locations to the places of interest.

According to an embodiment herein, the network connectivity device is further configured for guiding the users to reach from one place of interest to another using offline maps.

According to an embodiment herein, the system is further configured for supporting a visualization of the 360 degree panoramic view for the interactive multimedia and multi-lingual guided tour/panorama tour using a virtual reality device. The virtual reality device enables the user to experience the interactive multimedia and multi-lingual guided tour/panorama tour about the place of interest even without being physically present at the place of interest.

According to an embodiment herein, the system is configured for providing an option to the user to select a preferred language for the interactive multimedia and multi-lingual guided tour/panorama tour before streaming the audio visual content on the computing device of the user.

According to an embodiment herein, a computer implemented method comprising instructions stored on a non-transitory computer readable storage medium and executed on a computing device provided with a hardware processor and memory for providing an interactive multimedia and multi-lingual guided tour/panorama tour of a place of interest is provided. The method comprises the steps of enabling the user to connect with a locally hosted network connectivity device through a software application using his/her computing device such as smartphone or tablet. The user is prompted to register with the system through the computing device of the user based on a request received from the user. The system is configured for receiving a payment from the user for accessing a particular interactive multimedia and multi-lingual guided tour/panorama tour either via locally purchased scratch card or via a payment gateway provided in the software application hosted on the computing device of the user. The system is configured to provide an option to the user to choose a preferred language for interactive multimedia and multi-lingual guided tour/panorama tour and streaming the audio visual content related to the selected interactive multimedia and multi-lingual guided tour/panorama tour on the computing device of the user in the language selected by the user.

According to an embodiment herein, the system is further configured to stream a 360 degree panoramic view of the place of interest with a plurality of embedded audio clips dedicated to each feature of the place of interest.

According to an embodiment herein, the method further comprises establishing a communication between the user computing device and the server using internet in the absence of availability of the network connectivity device at the place of interest. The interactive multimedia and multi-lingual guided tour/panorama tour is streamed on the computing device of the user from the server using internet.

According to an embodiment herein, the method further comprises periodically synchronizing the connectivity device with the server for updates regarding addition of new language, addition/updating of a new audio clip, enhancement in the visual content of the interactive multimedia and multi-lingual guided tour/panorama tour.

According to an embodiment herein, the method further comprises enabling the users to use offline maps to provide the details of the place of interest and other nearby locations at the places of interest.

According to an embodiment herein, the method further comprises guiding the users to reach from one place of interest to another using offline maps.

According to an embodiment herein, the method further comprises supporting visualization of the 360 degree panoramic view for the interactive multimedia and multi-lingual guided tour/panorama tour using a virtual reality device. The virtual reality device enables the user to experience the interactive multimedia and multi-lingual guided tour/panorama tour about the place of interest even without being physically present at the place of interest.

The various embodiments herein provide a system and method for interactive multimedia and multi-lingual guided tour/panorama tour of a place of interest. The present invention provides a system and method for presenting an audio-visual tour of a place of interest to a user. The user is enabled to navigate through 360 degree panorama visuals of the place of interest such as a monument with a graphical user interface along with an audio support in multiple languages. On reaching near or at the place of interest, the user connects to a locally installed hardware device present at the place of interest and browses the guided tour on the smart devices like touch screen mobile phones and tablets of the user. The interactive multimedia and multi-lingual guided tour/panorama tour of the present invention is accessible even if the user is not present at or near the place of interest by connecting to the cloud servers provided by the system through internet either through Android or IOS app or through internet browser.

According to an embodiment herein, a method for embedding audio on the 360 degree panorama visuals of the place of interest is provided. The place of interest can be a historical monument, a tourist spot, a museum, a local park, a historic location, and the like. At first, a user needs to connect his/her smartphone or tablet to a locally hosted connectivity device in the monument through Wi-Fi hotspot. In case, if the user is not present in the monument where hardware device is installed then he/she can connect to a cloud based system using internet either through Android or IOS app or through internet browser. The user selects the guided tour of the place of interest after making a successful payment through either a payment gateway or via locally purchased scratch card. Once the guided tour of the specific monument is selected, user needs to select language of interest. Once connected an interactive audio-visual narration is initiated to provide detailed information about the place of interest selected by the user present in that location. Further the software application also allows the user to listen to the one or more audio clips embedded within the interactive multimedia and multi-lingual guide tour for every minute details of the monument at the place of interest. These embedded optional audio clips provide information about the place of interest, every monument within the place of interest or even to minute details of the monument within the place of interest. Additionally the user is enabled to play the audio clip multiple times till the user understands the details related to the monument.

According to an embodiment herein, the software application also allows the user to interact with the historic contents of the place of interest (such as musical pillar, manuscripts), and the like. The system and method further facilitates offline maps, gyroscope, VR supporting content etc.

According to an embodiment herein, the software application hosted on the computing device of the user also provides a payment gateway that facilitates the user to pay access charges related to the selected interactive multimedia and multi-lingual guided tour/panorama tour.

According to an embodiment herein, a system comprising content, hardware and software application providing an audio-visual tour of the place of interest or historical monument are provided. The system facilitates navigation around the places of interest, individual monuments and provides historical details related to each individual item and monuments present at the place of interest selected by the user.

FIG. 1 illustrates a functional block diagram of a system for providing interactive multimedia and multi-lingual guided tour/panorama tour of a place of interest, according to an embodiment herein. With respect to FIG. 1, the system comprises a computing device of the user 102, a connectivity device 104, a server 106 and a database 108. The connectivity device further comprises a second payment module 110 and a local database 112. The server 106 comprises a user registration module 114, a first payment module 116, a content module 118 and a processor 120.

According to an embodiment herein, the computing device 102 of the user is configured to connect with the connectivity device 104 installed at the place of interest to get access of the interactive multimedia and multi-lingual guided tour/panorama tour. The computing device 102 comprises a personal computer, smartphone, tablet, laptop, PDA or combinations thereof.

According to an embodiment herein, the connectivity device 104 is configured to establish communication with the server 106 and synchronize the audio visual content from the server 106 and store it in the local database 112. Any change in the audio visual content, for example addition of new language or addition or updation of new audio clip or enhancement in the visual content, at the server 106 is periodically synchronized by the connectivity device 104 to the local database 112.

According to an embodiment herein, the second payment module 110 is configured to receive the payment from the user via locally purchased scratch card, coupon codes, internet banking, credit card, debit card and the like. Once the payment is done successfully, the audio visual content is made available on the computing device of the user for a pre-defined time duration. In one example embodiment, the duration for availability of tour depends on the language selected by the user for viewing. For example, on payment of Rupees (Rs) 100, user is allowed to view the content for 100 minutes in English language and for 50 minutes in case of French language.

According to an embodiment herein, the computing device 102 is configured to establish communication with connectivity device 104. On successful establishment of the connection with the connectivity device 104, the connectivity device streams the audio visual content stored with the local database 112 without the need of the user to connect to the internet from the smartphone or tablet or any other smart devices. Thus, the user need not have to pay for the internet charges to access the interactive multimedia and multi-lingual guided tour/panorama tour.

According to an embodiment herein, the interactive multimedia and multi-lingual guide tour provides 360 degree panoramic view of the place of interest with multiple audio. The user can interact with 360 degree panoramic view of the place of interest and listen to the embedded audio clips in the computing device (smartphone) 102 after connecting to the locally hosted connectivity device 104. The interactive multimedia and multi-lingual guided tour/panorama tour comprises of multiple embedded optional audio clips within single panorama view with one audio clip dedicated to each feature of the place of interest.

According to an embodiment herein, along with the interactive multimedia and multi-lingual guide the connectivity device supports offline maps to provide the details of the place of interest and other nearby locations at the places of interest. Additionally, it also provides details about how to reach from one place of interest to another. In one example embodiment, the user is provided with an option of using interact services available with the connectivity device. In this case, an internet dongle/GSM chip is provided with the connectivity device which is installed at the place of interest. Further, the offline content gets updated via the internet dongle/GSM chip whenever the content is modified by the cloud based server.

According to an embodiment herein, the user computing device 102 is connected directly to the server 106 for accessing the interactive multimedia and multi-lingual guided tour/panorama tour/panorama tour using internet in the absence of availability of the connectivity device 104 at the place of interest. In an online approach, the content is stored in cloud based server and user accesses the content remotely either through the software application or through a web browser. The user makes payment for accessing the panorama tour using the first payment module. User is allowed to view the content for the pre-defined time duration by making payment either through scratch cards or by online payment mechanism (e.g. credit card, net banking, debit card etc.).

According to an embodiment herein, the second payment module 116 is configured to receive the payment from the user via locally purchased scratch card, coupon codes, internet banking, credit card, debit card and the like when the user computing device is connected directly to the server 106 using internet in the absence of availability of the connectivity device 104 at the place of interest.

According to an embodiment herein, the content module 118 is configured to stream the audio visual content from the server 106 upon receiving the request from the computing device of the user 102 when the user computing device is connected directly to the server 106 using internet in the absence of availability of the connectivity device at the place of interest.

According to an embodiment herein, the registration module 114 is configured for registering the users with the system 100 and for storing the details of all the users into the database 108 when the user computing device is connected directly to the server 106 using internet in the absence of availability of the connectivity device at the place of interest. The user registration page appears as soon as user connects to the connectivity device or to the cloud based server. The user is allowed to register using any of the OpenID authentication platforms such as Google account, Facebook account, Linkedin account etc. Once registered, user does not need to register with the system again while accessing the system using same computing device. User is also allowed to login via any other device by providing same login credentials.

According to an embodiment herein, the server 106 is hosted on the cloud to provide access to the interactive multimedia and multi-lingual guide from multiple channels i.e. either directly to the user computing device 102 using internet or via connectivity device 104 installed at the place of interest. The server 106 comprises a processor 120 configured for processing requests received from other modules and interacts with the database 108.

According to an embodiment herein, the system supports visualizing the 360 degree panoramic view using virtual reality device. With the help of virtual reality support the user is able to experience the interactive multimedia and multi-lingual guided tour/panorama tour/panorama tour about the place of interest even without being physically present there.

According to an embodiment herein, the system supports experiencing the interactive multimedia and multi-lingual guided tour/panorama tour/panorama tour in an offline manner via computing device of the user at his place of convince without being physically present at the place of interest.

According to an embodiment herein, the system supports accessing audio visual multimedia and multi-lingual content of the place of interest directly from the computing device of the user via the internet.

According to one embodiment of the present invention, the system further comprises an augmented reality module 122. The augmented reality module 122 is configured for providing details of the sculptures present at the place of interest to the user whenever the user moves his/her computing device pointing towards the sculpture.

Figure 2:
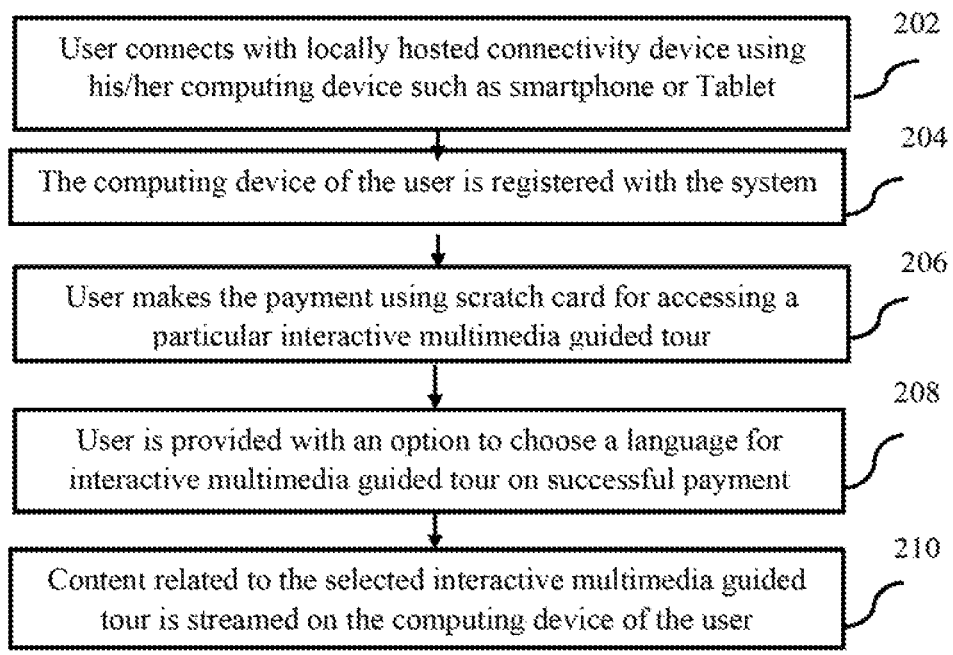
FIG. 2 illustrates a flowchart explaining a method of using an interactive multimedia and multi-lingual guided tour/panorama tour, according to an embodiment herein.

FIG. 2 illustrates a flowchart explaining a method for using interactive multimedia and multi-lingual tour guide, according to an embodiment herein. With respect to FIG. 2, the method comprises the user connecting with locally hosted connectivity device using his/her computing device such as smartphone or tablet (202). On establishing connection with the connectivity device 104, the computing device of the user is registered with the system based on a request received from the user (204). The user makes the payment for accessing a particular interactive multimedia and multi-lingual guided tour/panorama tour/panorama tour either via locally purchased scratch card or via a payment gateway provided in the software application hosted on the computing device of the user (206). The payment gateway supports payment via net banking, credit card and the like. On successful reception of payment, the user is provided with an option to choose a language for interactive multimedia and multi-lingual guided tour/panorama tour/panorama tour (208). Further, the content related to the selected interactive multimedia and multi-lingual guided tour/panorama tour is streamed on the computing device of the user in the language selected by the user (210).

Therefore, the embodiments herein provide an interactive multimedia and multi-lingual tour guide. The system provides an audio-visual tour of a place of interest to a user. The user is enabled to navigate through 360 degree panorama visuals of the place of interest such as a monument with a graphical user interface along with audio support in multiple languages. The system interacts with the user in the user's native language making them more comfortable. The biggest advantage of the system is easy access to the user through user's computing device in the presence or absence of internet.

The flexibility of the interactive multimedia and multi-lingual tour guide allows the user to begin a tour at any point allowing the user an unprecedented degree of freedom in their sightseeing.

The system and method further facilitates, offline maps, gyroscope, VR supporting content etc. The system is not location/GPS guided and thus is easy to access from anywhere. With the help of VR support the user is able to experience the interactive multimedia and multi-lingual tour guide about place of interest even without being physically present there.

Thus, the system allows an unfamiliar user to receive a near optimal experience, suited to his/her schedule, needs, and interests. The experience gives a detailed overview of the place of interest so that user does not return feeling that they have missed a key element.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be the to fall there between.

What is claimed is:

1. A system for providing an interactive multimedia and multi-lingual guided tour/panorama tour of a place of interest, the system comprising:
   a computing device of the user, and wherein the computing device of the user is configured for hosting a software application, and wherein the software application enables the user to access the interactive multimedia and multi-lingual guided tour/panorama tour of the place of the interest on request;
   a server communicatively coupled with the computing device of the user;
   a user registration module provided in the server and run on a hardware processor, and, wherein the user registration module is configured for registering the user with the system using one or more user details;
   a first payment module provided in the server and run on a hardware processor, and wherein the first payment module is configured for enabling the user to make a payment for accessing a particular interactive multimedia and multi-lingual guided tour/panorama tour; and
   a content module provided in the server and run on a hardware processor, and wherein the content module is configured for streaming audio visual content related to the particular requested interactive multimedia and multi-lingual guided tour/panorama tour on successful reception of the payment from the user;
   a network connectivity device installed at each place of interest associated with the system, and wherein the network connectivity device is configured for establishing communication with the server to synchronize the audio visual content for the interactive multimedia and multi-lingual guided tour/panorama tour from the server and for storing the synchronized audio visual content in a local database, and wherein the network connectivity device is further configured for streaming the audio visual content stored in the local database to the computing device of the user on request and after reception of successful payment, and wherein the audio visual content for the requested interactive multimedia and multi-lingual guided tour/panorama tour is streamed in an offline mode from network connectivity device to the user computing device without establishing intern& connection between the computing device of the user and the server, and wherein the network connectivity device is further configured for periodically synchronizing with the server for updates regarding addition of new language, adding/updating a new audio clip and enhancement in the visual content of the interactive multimedia and multi-lingual guided tour/panorama tour.

2. The system according to claim 1, wherein the interactive multimedia and multi-lingual guide tour comprises a 360 degree panoramic view of the place of interest with a plurality of embedded audio clips highlighting each feature of the place of interest.

3. The system according to claim 1, wherein the computing device of the user comprises a personal computer, a smartphone, a tablet, a laptop and a PDA.

4. The system according to claim 1, further comprises a database, and wherein the database is configured for storing registration details for the plurality of users associated with the system, payment details for the plurality of transactions performed by the system and audio visual content of a plurality of interactive multimedia and multi-lingual guided tour/panorama tours offered by the system.

5. The system according to claim 1, wherein the network connectivity device further comprises a second payment module, and wherein the second payment module is configured for enabling the users to make payments for accessing the plurality of interactive multimedia and multi-lingual guided tour/panorama tours offered by the system when the internet connection with the server is not established.

6. The system according to claim 1, wherein payment receiving module is configured to prompt/enable the user to make payment for the selected interactive multimedia and multi-lingual guided tour/panorama tour via a locally purchased scratch card, coupon codes and via a payment gateway provided in the software application hosted on the computing device of the user.

7. The system according to claim 1, wherein the network connectivity device is further configured for supporting offline maps to provide the details of the place of interest and other nearby locations at the places of interest.

8. The system according to claim 7, wherein the network connectivity device is further configured for guiding the users to reach from one place of interest to another using offline maps.

9. The system according to claim 1, wherein the visualization module or display device or virtual reality device or user interface device is configured for supporting visualization of the 360 degree panoramic view for the interactive multimedia and multi-lingual guided tour/panorama tour, and wherein the virtual reality device is configured to enable the user to experience the interactive multimedia and multi-lingual guided tour/panorama tour about the place of interest even without being physically present at the place of interest.

10. The system according to claim 1, wherein the user interface is configured for providing an option to the user to select a preferred language for the interactive multimedia and multi-lingual guided tour/panorama tour before streaming the audio visual content on the computing device of the user.

11. A computer implemented method comprising instructions stored on a non-transitory computer readable storage medium and run on a computing device provided with a hardware and memory for using an interactive multimedia and multi-processor lingual guided tour/panorama tour of a place of interest, the method comprising the steps of:

connecting the user with a locally hosted network connectivity device through a software application using his/her computing device such as smartphone or tablet;

registering the user with the system through the computing device of the user based on a request received from the user;

receiving a payment from the user for accessing a particular interactive multimedia and multi-lingual guided tour/panorama tour either via locally purchased scratch card or via a payment gateway provided in the software application hosted on the computing device of the user;

providing an option to the user to choose a preferred language for an interactive multimedia and multi-lingual guided tour/panorama tour; and streaming the audio visual content related to the selected interactive multimedia and multi-lingual guided tour/panorama tour on the computing device of the user in the language selected by the user;

installing a network connectivity device at each place of interest associated with the system, and wherein the network connectivity device is configured for establishing communication with the server to synchronize the audio visual content for the interactive multimedia and multi-lingual guided tour/panorama tour from the server and for storing the synchronized audio visual content in a local database, and wherein the network connectivity device is further configured for streaming the audio visual content stored in the local database to the computing device of the user on request and after reception of successful payment, and wherein the audio visual content for the requested interactive multimedia and multi-lingual guided tour/panorama tour is streamed in an offline mode from network connectivity device to the user computing device without establishing interne connection between the computing device of the user and the server, and wherein the network connectivity device is further configured for periodically synchronizing with the server for updates regarding addition of new language, adding/updating a new audio clip and enhancement in the visual content of the interactive multimedia and multi-lingual guided tour/panorama tour.

12. The method according to claim 11, further comprises streaming a 360 degree panoramic view of the place of interest with a plurality of embedded audio clips dedicated to each feature of the place of interest.

13. The method according to claim 11, further comprises establishing a communication between the user computing device and the server using internet in the absence of availability of the connectivity device at the place of interest, and wherein the interactive multimedia and multi-lingual guided tour/panorama tour is streamed on the computing device of the user from the server using internet.

14. The method according to claim 11, further comprises periodically synchronizing the network connectivity device with the server for updates regarding addition of new language, adding/updating a new audio clip, enhancement in the visual content of the interactive multimedia and multi-lingual guided tour/panorama tour.

15. The method according to claim 11, further comprises enabling the users to use offline maps to provide the details of the place of interest and other nearby locations at the places of interest.

16. The method according to claim 15, further comprises guiding the users to reach from one place of interest to another using offline maps.

17. The method according to claim 11, further comprises supporting visualization of the 360 degree panoramic view for the interactive multimedia and multi-lingual guided tour/panoramic view for the interactive multimedia and multi-lingual guided tour/panorama tour using a virtual reality device, and wherein the virtual reality device enables the user to experience the interactive multimedia and multi-lingual guided tour/panorama tour about the place of interest even without being physically present at the place of interest.

* * * * *